(12) United States Patent
Willardson et al.

(10) Patent No.: US 11,907,874 B2
(45) Date of Patent: Feb. 20, 2024

(54) APPARATUS AND METHOD FOR GENERATION AN ACTION VALIDATION PROTOCOL

(71) Applicant: Gravystack, Inc., Phoenix, AZ (US)

(72) Inventors: Chad Willardson, Phoenix, AZ (US); Scott Donnell, Phoenix, AZ (US); Travis Adams, Phoenix, AZ (US)

(73) Assignee: Gravystack, Inc.

( * ) Notice: Subject to any disclaimer, the term of this patent is extended or adjusted under 35 U.S.C. 154(b) by 0 days.

(21) Appl. No.: 17/872,847

(22) Filed: Jul. 25, 2022

(65) Prior Publication Data
US 2024/0028986 A1   Jan. 25, 2024

(51) Int. Cl.
*G06Q 10/0631* (2023.01)

(52) U.S. Cl.
CPC .............................. *G06Q 10/063112* (2013.01)

(58) Field of Classification Search
CPC ............................................. G06Q 10/063112
USPC ....................................................... 705/7.14
See application file for complete search history.

(56) References Cited

U.S. PATENT DOCUMENTS

| | | |
|---|---|---|
| 9,911,088 B2 | 3/2018 | Nath |
| 11,270,263 B2 | 3/2022 | Shah |
| 11,544,345 B1 * | 1/2023 | Stewart .................. G06N 5/048 |
| 2014/0343984 A1 * | 11/2014 | Shahabi ........... G06Q 10/06311 |
| | | 705/7.13 |
| 2015/0332187 A1 | 11/2015 | Yankelevich |
| 2017/0323211 A1 * | 11/2017 | Bencke .................. G06Q 10/00 |
| 2019/0378017 A1 * | 12/2019 | Kung ..................... G06N 3/063 |
| 2021/0182767 A1 * | 6/2021 | Tibrewala ...... G06Q 10/063114 |

FOREIGN PATENT DOCUMENTS

| | | | | |
|---|---|---|---|---|
| WO | WO-2017196820 A1 * | 11/2017 | ............... | G06N 5/04 |
| WO | WO-2019006967 A1 * | 1/2019 | ....... | G06Q 10/06311 |

OTHER PUBLICATIONS

Vakharia, Beyond Mechanical Turk: An Analysis of Paid Crowd Work Platf, 2015, https://www.researchgate.net/profile/Donna-Vakharia/publication/279913137_Beyond_Mechanical_Turk_An_Analysis_of_Paid_Crowd_Work_Platforms/links/559d8f2908ae76bed0bb415f/Beyond-Mechanical-Turk-An-Analysis-of-Paid-Crowd-Work-Platforms.pdf.*

* cited by examiner

*Primary Examiner* — Mehmet Yesildag
*Assistant Examiner* — James Webb
(74) *Attorney, Agent, or Firm* — Caldwell Intellectual Property Law

(57) ABSTRACT

The invention is directed towards an apparatus and method for generating an action validation protocol. A processor is configured to receiver user data relating to an action datum. The processor is configured to select an action datum validator. The action datum is transmitted to the action datum validator where an action datum label is selected. Once an action datum validator selects an action label, the action is further categorized. If the action datum has not been completed, it will be sent back to the action datum identifier.

20 Claims, 9 Drawing Sheets

US 11,907,874 B2

APPARATUS AND METHOD FOR GENERATION AN ACTION VALIDATION PROTOCOL

FIELD OF THE INVENTION

The present invention generally relates to the field of cryptography. In particular, the present invention is directed to apparatus and method for generating an action validation protocol

BACKGROUND

Task validation is used to confirm the completion of an activity. There is a need to use crowdsourcing to validate the completion of a user's action.

SUMMARY OF THE DISCLOSURE

In an aspect an apparatus for generating an action validation protocol associated with an action identifier includes at least a processor, a memory connected to the at least a processor, the memory containing instructions configuring the at least a processor to retrieve an action datum, select an action datum validator, transmit the action datum to the selected action datum validator, receive an input from the selected action datum validator and generate an action datum label as a function of the input from the selected action datum validator.

In another aspect a method for generating an action validation protocol includes receiving, by a processor, an action datum, selecting, by a processor, an action datum validator, transmitting, by a processor, the action datum to the selected action datum validator, receiving, by a processor, an input from the selected action datum validator, and generating, by the processor, an action datum label.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For illustrating the invention, the drawings show aspects of one or more embodiments of the invention. However, it should be understood that the present invention is not limited to the precise arrangements and instrumentalities shown in the drawings, wherein.

Figure 1:
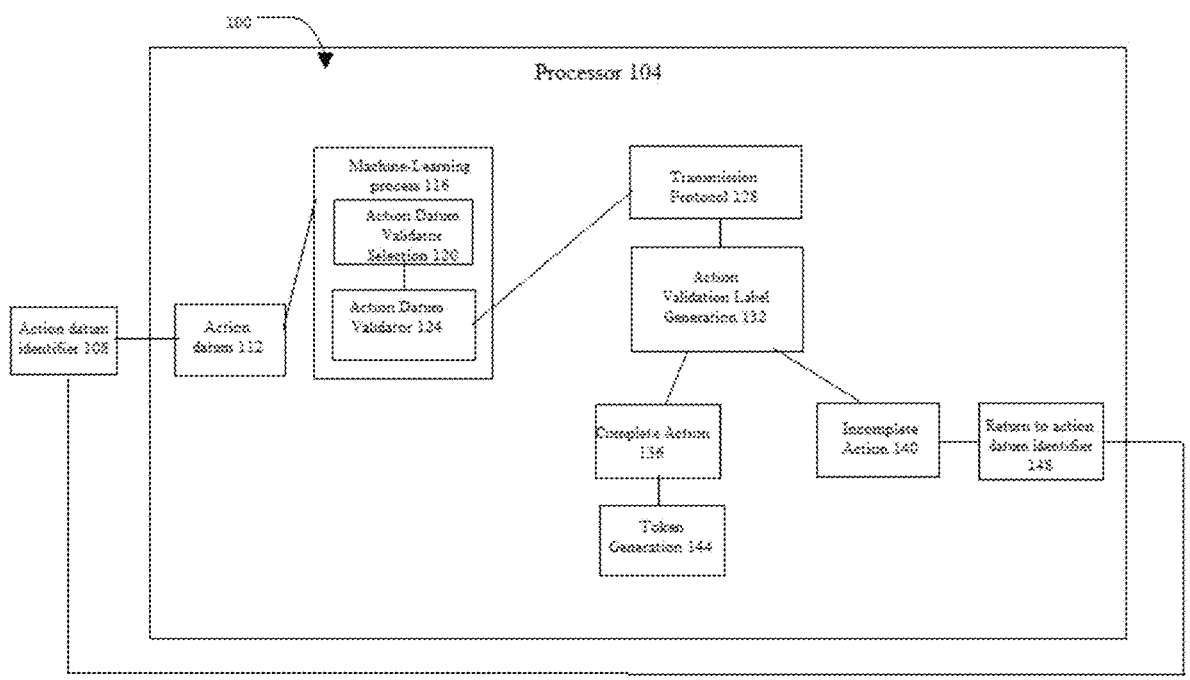
FIG. 1 is a block diagram illustrating an apparatus for action-datum validation.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a gig validation protocol associated with a gig identifier and a gig validator. In an embodiment, tools such as machine-learning algorithms, data validation protocols, and the like are used to match a submitted action datum and action identifier to an action datum validator. The use of action datum validators to validate action datums completed by an action identifier utilizes crowdsourcing as a means of confirming completion of an action. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from a lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, Exemplary embodiment of an apparatus 100 for generating an action validation protocol is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting Processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, Processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Continuing reference to FIG. 1, apparatus 100 may begin the action validation protocol with an action identifier 108. An "action validation protocol," as used herein, is a procedure used to conduct an action validation. An "action validation" as used herein describes a datum representing and/or proving validity or accuracy of the task that the action datum identifier engaged with. An example of an action validation protocol may be having an action identifier complete the action datum and upload a picture of the completed action to a processor. The photo may be taken with a three-hundred-sixty degree view and also have a voice description of the task completed. An "action datum identifier," as used herein, is data identifying a user who may perform a task described in an action positing. An "action posting" as used herein, is a task that has been made viewable to an action identifier. A "task" as used herein, is a piece of work to be done or undertaken. For example, action datum identifier 108 may identify a child who had an action posting for mowing the lawn. Action identifier mows the lawn, then posts a picture of the mowed lawn to the server where it can move through the rest of the action validation protocol. Action datum identifier 108 completes action datum 112 to begin the action validation protocol. As used herein, an "action" is the fact or process of doing something, typically to achieve an aim. An action may be a task or chore of some sort. For example, an action may be a task including mowing the lawn, doing the dishes, walking the dogs, and the like. An action posting also may be an action that has been uploaded so that an action identifier knows there is an action that needs to be completed. An action posting may be uploaded to an action identifier's profile by an action identifier's parental figure or other authoritative figure.

Further referencing FIG. 1, completion of an action datum 112 may include a submission of evidence to processor 104. In an embodiment, upon completion of an action datum 112, an action datum identifier 108 may upload evidence such as input image data to processor 104 showing that action datum 112 is ready to validation. Input image data may be captured by an image capture device such as a camera, scanner, or the like. In an embodiment, an input image data may include a picture of a certificate showing completion of a course, such as a TOASTMASTERS course. Toastmasters is headquartered at Englewood, Colorado. In another embodiment, an input image data may show a successfully tied shoe. In another embodiment, input image data may show a completed 'level' in a game. In yet another embodiment, input image data may include a written testimony indicating that an assignment is complete. For example, a teacher of a child may provide a testimony to attest to the fact that the child (action datum identifier 108) has improved their math skills. Additionally, or alternatively, evidence showing an indication of completion of an action datum 112 may include audio. For example, audio may show a complete run through of a piece of music that an action datum identifier 108 has been practicing. Audio may be captured using a microphone, or the like.

Continuing reference to FIG. 1, machine-learning process 116 may find potential action datum validators to validate action datum 112. A "machine-learning process," as used herein, is a process which uses data and algorithms to imitate the way that humans learn. A machine-learning process also refers to the process of making a system that can learn and improve by itself, after being specifically programmed. An example of a machine-learning process is image recognition. Imagine recognition occurs when a processor can identify an object as a digital image and obtain qualities of that image through use of various specific programs. Another example of machine-learning process that may be used is speech recognition. Speech recognition can be used to translate speech into text, such as voice search, voice dialing, appliance control, and the like. Machine-learning process 116 may use training data that may contain a plurality of inputs containing action datum validator information correlated to a plurality of outputs that may contain action datum validators 124. An "action datum validator" as used herein, is a user who may have acquired some level of knowledge about the action datum and can give insight as to whether the action datum was completed properly or not. A "specified location" as used herein, is a user's entire information procession environment, or a portion thereof, which may be located at multiple sites or a specific location. Examples of specified locations that can be used to select an action datum validator are their zip code, city, street address, and the like. Other examples of possible action datum validator information could be geo-location, time-zone, age, experience level, and the like. Selecting action datum validator 124 may comprise locating a plurality of validators within a specified location. Within machine learning process 116, action datum validator selection 120 may occur. An "action datum validator selection" as used herein is a process by which the processor matches an action datum validator to an action datum for validation. Action datum validator selection 120 may use any set of data to group action datum validators into smaller subgroups that may be used within machine-learning process 116. An "action datum validator" is a third party that validates completion of an action datum. A "third party," as used in this disclosure, is a user who is not identified by action identifier. An action datum validator may include another user that may have some level of experience in the action datum field and may have the ability to assess whether action identifier 108 has completed action datum 112. An example of action datum validator 124 may be another user who has mowed a lawn over thirty times, and now would be considered experienced in mowing lawns. This user could then validate if other users have successfully mowed a lawn by either validating or invalidating the action datum that has been sent. Action datum validator 124 may not be the same user as a user identified by action identifier 108. During action datum validator selection 120, there may be a verification protocol to ensure that action datum validator 124 is an actual user. There may be at least one action datum validator 124 used to validate action datum 112. Each action datum validator 124 may be unrelated to each other. Apparatus 100 is configured to parse user data, for instance to identify an action attribute. In some embodiments, processor 104 may transcribe much or even substantially all verbal content from audiovisual data, such as a video or a voice memo, or the like. Processor 104 may transcribe verbal content by way of speech to text or speech recognition technologies. Exemplary automatic speech recognition technologies include, without limitation, dynamic time warping (DTW)-based speech recognition, end-to-end automatic speech recognition, hidden Markov models, neural networks, including deep feedforward and recurrent neural networks, and the like. For additional disclosure and information related to identify verification may be found in U.S. patent application U.S. Ser. No. 17/872,328 entitled "APPARATUS AND METHOD FOR INTERNET-BASED VALIDATION OF TASK COMPLETION," the entirety of each which in incorporated herein by reference.

Continuing reference to FIG. 1, action datum validator selection 120 may utilize a cryptanalysis protocol. The term "cryptanalysis protocol" as used herein, refers to the process of deciphering complex strings of user data. Cryptanalysis protocol may analyze all action datum identifier 108 data and find consistencies with a group of potential action datum validators 124. Types of information that the cryptanalysis protocol may use may include address, intelligence level, emotional intelligence levels, time spent online, average time to complete a task, and the like. Cryptanalysis protocol may utilize diverse types of algorithms to decipher sensitive information that a user does not want available to the entirety of the platform, which could help match an action datum identifier with an action datum validator. Cryptanalysis protocol may use any of the information added within the disclosure. A digital signature may be used to verify an action datum validator 124.

As used in this disclosure, "verification" is a process of ensuring that which is being "verified" complies with certain constraints, for example without limitation system requirements, regulations, and the like. In some cases, verification may include comparing a user, such as without limitation an action datum validator 124 against one or more acceptance criteria. For example, in some cases, an action datum validator 124 may be required to go through multi-factor authentication. Ensuring that action datum validator 124 is in compliance with acceptance criteria may, in some cases, constitute verification. In some cases, verification may include ensuring that data is complete, for example that all required data types, are present, readable, uncorrupted, and/or otherwise useful for processor 104. In some cases, some or all verification processes may be performed processor 104. In some cases, at least a machine-learning process, for example a machine-learning model, may be used to verify. Processor 104 may use any machine-learning process described in this disclosure for this or any other function. In some embodiments, at least one of validation and/or verification includes without limitation one or more of supervisory validation, machine-learning processes, graph-based validation, geometry-based validation, and rules-based validation Processor 104 may use multi-factor authentication to verify the identity of a user. A "multi-factor authentication" as used herein, refers to an electronic authentication method in which a user is granted access to an application only after successfully presenting at least two different identity confirming information to a processor. Examples of forms of multi-factor authentication are knowledge, possession, inherent, location, and the like. Multi-factor authentication through the use of knowledge may require an action datum identifier or action datum validator to prove knowledge of a secret in order to authenticate. A password may be used as a mechanism for knowledge authentication. Multi-factor authentication through the use of possession may require a passcode or a security token as a possession factor to authenticate the identity of the action datum identifier or the action datum validator. Multi-factor authentication through the use of inherent knowledge may require the action datum identifier or action datum validator to provide a biometric sample such as a fingerprint or face scan to verify one's identity. Behavioral biometrics such as keystroke dynamics can also be used as inherent verification. Multi-factor authentication through the use of location may require the action datum identifier and action datum to disclose their location to verify their identity. Processor 104 may require action datum validator 124 to scan their lips as a biometric verification. Processor 104 may require action datum validator 124 to submit dental records as a form of biometric verification. Dental records coupled with a lip scan conducted upon entry to the platform may be used as a multi-factor authentication procedure to verify the action datum validator's identity. Processor 104 may use facial identification that requires the action datum validator to blink five times, look left, look right, look up then look down so that a full retinal exam may be conducted.

Continuing reference to FIG. 1, action datum 112 may be transmitted to selected action datum validator 124 using a transmission protocol 128. For instance, action datum 112 may be transmitted to selection action datum validator 124 through an emailed notification or mobile phone alert. Once action datum validator 124 has been verified and cleared to validate action datum 112, they may receive an email or text notification that an action datum has been transmitted to their account for viewing. A "transmission protocol" as used herein, is a process by which the action datum is received from the action datum identifier and sent to the action datum validator for validation. Transmission protocol 128 may require that an action datum identifier provides their signature affirming that the action datum was completed to the best of their ability. Transmission protocol 128 may also require that the action datum validator provides photographic evidence that they are the only users who are viewing and validating the action datum.

Continuing reference to FIG. 1, an action validation label 132 may be used to organize the input regarding action datum validator's validation selection for action datum 112. An "action validation label," as used herein, is a label identifying a user's completion and/or participation in a task. An action datum validator 124 may assign action datum 112 an action validation label 132. An example of an action validation label may be either "valid," "invalid," "inconclusive," and the like. Receiving the input from the selected action datum validators 124 further comprises receiving a validity string. A "validity string" as used herein, is a string and/or collection data values that are made up from the information collected from the action validation labels. Each of the assigned action datum validators 124 may assign their own action validation label 132. Each of the action datum validators 124 may use a binary response such as valid or invalid. The action datum may be graded on a spectrum such as from 0-100. The action datum may be given an alphabetical ranking system. The completion of the action datum could be validated by identifying the percentage of the action that was finished, and the like. The term "input" as used herein, refers to data that is uploaded to processor 104. Examples of input may be any selection or verification regarding the completion of action datum 112. If an action datum validator deems the action datum as completed, the action datum validator may upload their input to the processor so that the action datum identifier can be made aware of their impression of the completed action datum. Inputs from action validators may be digitally signed and/or posted as entries to an "immutable sequential listing." The term "valid" refers to an action datum that has been executed properly by an action identifier. An example of action validation label generation 132 with a valid label could occur when an action identifier submits action datum that depicts a properly mowed lawn. An action datum validator would then assign the corresponding action datum a valid label. The term "invalid" refers to an action datum that has not been properly executed by an action identifier. An example of action validation label generation 128 with an invalid label could occur when an action identifier submits an action datum that depicts a half full sink of dishes. If the action post were to clean all the dishes, the action datum has not been satisfied, thus the action datum validator would label the action datum invalid. When action datum 112 is considered a complete action 136, action datum validators 124 may be assigned a token for their contribution. A "completed action" as used herein, refers to an action datum that has been submitted by action datum identifier and validated by an action datum validator 124. Processor 104 may be configured to generate a token certificate 144 that may be associated with the completion of action datum 112. As used in this disclosure, a "token certificate" is a unique and non-interchangeable unit of data stored on a ledger representing ownership of an asset and/or a financial interest. As used in this disclosure, a "ledger" is a digital immutable ledger where data entries may be posted and cannot be altered. Accordingly, token certificate 144 may prove ownership of an asset. An asset may include an achievement, physical artwork, digital artwork, music, in-game items, videos, photographs, real estate, and the like. In an embodiment, token certificate 144 may be a virtual embodiment of an achieved objective and/or completed assignment.

Continuing to reference FIG. 1, token certificate 144 may be associated with action datum validator 124. As used herein, a "action datum validator" is a public key or a piece of data that associates a user to the block of information. Action datum validator 124 may own token certificate 152 upon the validation of action datum 112. An action datum validator 124 may give information, such as their name, email, phone number, username, and/or other personal identifying information may be associated with token certificate 132. An action datum validator 152 may be posted on an immutable sequential listing. The action datum validator 124 may be retrieved and used to generate the token certificate 144. For example, the action datum validator 152 may be linked with the completed action 136, and when the action datum 112 is complete, the token certificate 144 is generated and linked to the action datum validator 124. In an embodiment, the token certificate 144 and the associated owner, which may be action datum validator 124, may be shared and visible to other people with access to the immutable sequential listing. In an embodiment, apparatus 100 may allow people, such as employers, or the like, to view accomplishments/assignments completed by an action datum validator 124, action identifier 108 and and/or processor 104. A token certificate 144 may be shared through a network, such as a wireless network. A token certificate 144 may be shared through a link, such as a URL link.

Additional disclosure on token certificate generation can be found in U.S. patent application Ser. No. 17/872,254, filed on Jul. 25, 2022, entitled "AN APPARATUS AND METHOD FOR GENERATING A TOKEN CERTIFICATE ASSOCIATED WITH AN ASSIGNMENT," which is hereby incorporated by reference.

Further referencing FIG. 1, when action datum 112 is considered an invalid, action datum 112 may be sent back to action datum identifier 108 to edit and resubmit. An action datum is "invalid," as used herein, if the action datum has not been completed correctly. The process of returning incomplete action to action identifier 108 may give action identifier 108 the opportunity to restart the action datum validation protocol. Action identifier 108 may be able to restart action datum validation protocol as many times as needed until a complete action 136 is assigned.

Further referencing FIG. 1, after each action datum validator 124 performs action validation label generation 132, the labels then may be compiled into an aggregate label. If each action datum validator 124 assigns action datum 112 a valid label, then the action datum 112 is considered a complete action 136. For example, there may be three action datum validators and all three action datum validators affirm that the action was completed properly and label the action as valid. Since all three action datum validators assigned the action as valid, the action will be considered a complete action. If the control label has a discrepancy between action validation labels, action datum 112 may be labeled as an incomplete action 140. For example, there may be three action datum validators and one of the action datum validators decides that the action was not properly completed so the action datum label would register as incomplete. Since all three of the action datum validators did not label the action as valid, the action is considered an incomplete action.

Still referring to FIG. 1, in some embodiments, apparatus 100 may include a machine vision process. A machine vision process may use images and images from videos submitted as action datum 112 to make a determination about the completion action 136. For example, in some cases a machine vision process may be used for world modeling or registration of objects within a space. In some cases, registration and/or action datum 112 recognition may include image processing, such as without limitation object recognition, action datum detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

Still referring to FIG. 1, in some cases, machine vision process may perform pose-estimation for example to ascertain a relative location or movement of objects within action datum 112. Including one or more transformations, for example to a view of a frame relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; image recognition and/or edge detection software may be used to detect a multiple views of images of an object (from subsequent frames) to derive a relative position along a third (z) axis. In some cases, solicitation video 108 may include a stereo image, having two stereoscopic views, which may be compared to derive z-axis values of points on object permitting, for instance, derivation of further z-axis points within and/or around the object using interpolation. Alternatively, or additionally, relative movement within an image component (e.g., frame to frame) may be used to ascertain positions of objects, even along a z-axis, for instance by way of kinetic parallax. In some cases, relative motion of objects further away may occur at a different speed than objects nearby, this phenomenon may be used to ascertain a position of objects relative a camera, for example when the camera is moving. Object recognition and pose estimation may be repeated with multiple objects in field of view. In an embodiment, x and y axes may be chosen to span a plane common to a field of view of a camera used for image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

Still referring to FIG. 1, in some cases, a machine vision process may use a classifier, such as any classifier described throughout this disclosure. In some cases, a classifier may classify action datum 112 into categories, such as successful completion and/or incomplete. In some cases, action datum 112 may be represented and/or processed as a signal. As used in this disclosure, a "signal" is any intelligible representation of data, for example used to convey data from one device to another. A signal may include an optical signal, a hydraulic signal, a pneumatic signal, a mechanical, signal, an electric signal, a digital signal, an analog signal and the like. In some cases, a signal may be used to communicate with a processor 104, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), wavelet transform, finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, processor 104 may also employ automatic speech recognition to examine action datum 112. Exemplary automatic speech recognition technologies include, without limitation, dynamic time warping (DTW)-based speech recognition, end-to-end automatic speech recognition, hidden Markov models, neural networks, including deep feedforward and recurrent neural networks, and the like. In an embodiment, automatic speech recognition may be used to determine whether an assignment 108 was complete. For example, speech recognition may be used to authenticate or verify an identity of a speaker. Speaker may be action identifier 108. In another example, a speaker may be action identifier 108 demonstrating their Chinese ability in a video submitted as evidence.

Figure 2:
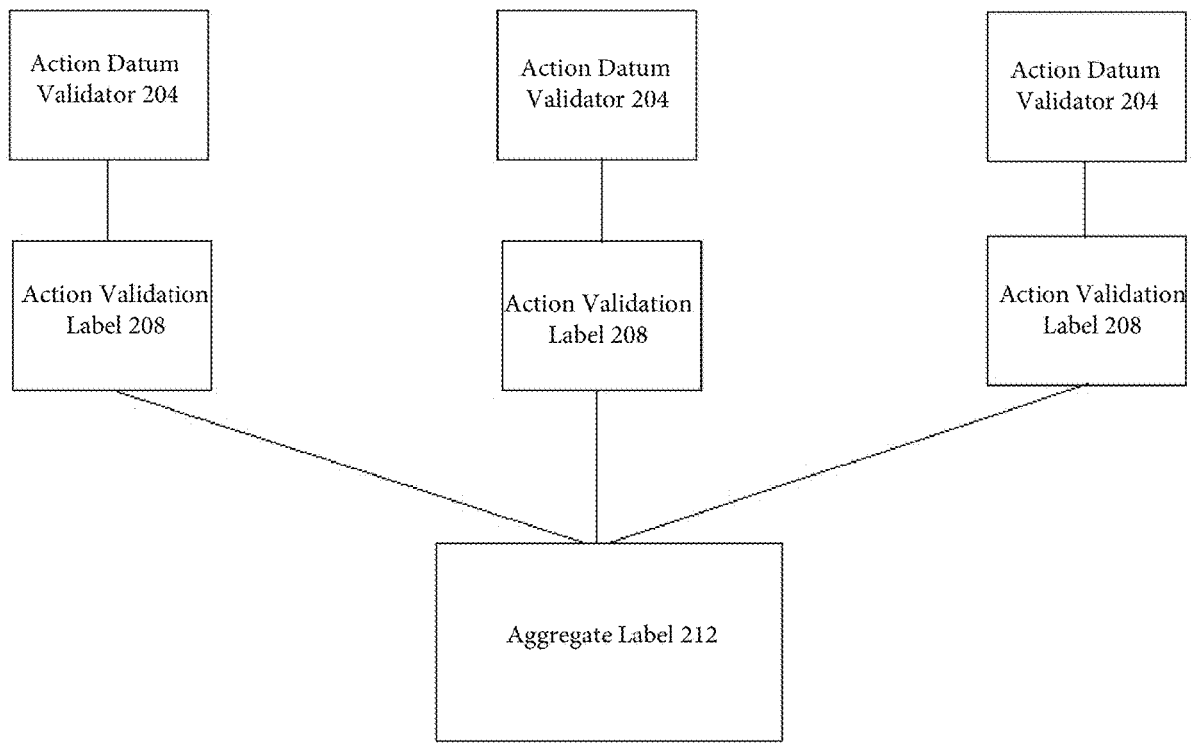
FIG. 2 illustrates a block diagram of an aggregate action.

Referencing FIG. 2, an exemplary aggregate label 212 process is shown. In this exemplary model, there are three action datum validators 204. Each of the action datum validators 204 gives action datum 112 an action validation label 208. The action validation label 208 as described above in FIG. 1 may be valid 132, invalid 136, and the like. Action validation label 208 as described above in FIG. 1 may use an embodiment of 'Fuzzy Set Comparison.' The term 'fuzzy set' as used herein, refers to the integration of elements having a changing degree of membership in a set. Fuzzy set comparison will be further described below in FIG. 3. If all action validation label s 208 associated with action datum 112 register as valid 132, then the aggregate label 212 for action datum 112 will register as a complete action 140. If at least one action validation label 208 for action datum 112 registers as invalid 136, then the aggregate label 212 for action datum 112 will register as an incomplete action 144.

Figure 3:
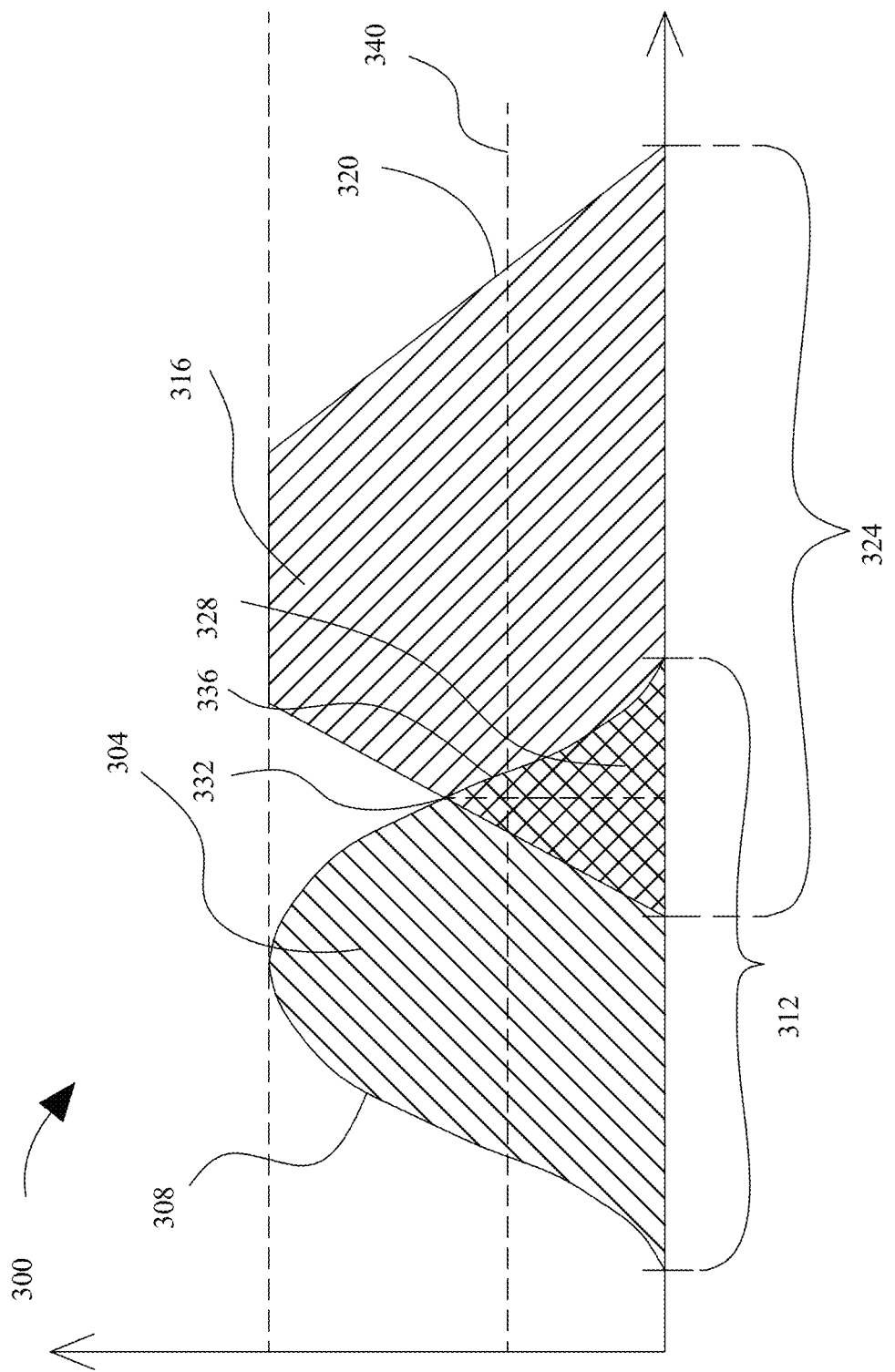
FIG. 3 is a graph depicting fuzzy set parameters.

Referring to FIG. 3, an exemplary embodiment of fuzzy set comparison 300 is illustrated. A first fuzzy set 304 may be represented, without limitation, according to a first membership function 308 representing a probability that an input falling on a first range of values 312 is a member of the first fuzzy set 3304, where the first membership function 308 has values on a range of probabilities such as without limitation the interval [0,1], and an area beneath the first membership function 308 may represent a set of values within first fuzzy set 304. Although first range of values 312 is illustrated for clarity in this exemplary depiction as a range on a single number line or axis, first range of values 312 may be defined on two or more dimensions, representing, for instance, a Cartesian product between a plurality of ranges, curves, axes, spaces, dimensions, or the like. First membership function 308 may include any suitable function mapping first range 312 to a probability interval, including without limitation a triangular function defined by two linear elements such as line segments or planes that intersect at or below the top of the probability interval. As a non-limiting example, triangular membership function may be defined as:

$$y(x,a,b,c)=\{ (0, \text{for } x>c \text{ and } x<a @ (x-a)/(b-a), \text{for } a \leq x<b @ (c-x)/(c-b), \text{if } b<x \leq c)\dashv$$

a trapezoidal membership function may be defined as:

$$y(x,a,b,c,d)=\max(\min((x-a)/(b-a),1,(d-x)/(d-c)),0)$$

a sigmoidal function may be defined as:

$$y(x,a,c)=1/(1-e^{\char`\^}(-a(x-c)))$$

a Gaussian membership function may be defined as:

$$y(x,c,\sigma)=e^{\char`\^}(-\tfrac{1}{2}((x-c)/\sigma)^{\char`\^}2)$$

and a bell membership function may be defined as:

$$y(x,a,b,c,)=[1+|(x-c)/a|^{\char`\^}2b]^{\char`\^}(-1)$$

Persons skilled in the art, upon reviewing the entirety of this disclosure, will be aware of various alternative or additional membership functions that may be used consistently with this disclosure.

Still referring to FIG. 3, first fuzzy set 304 may represent any value or combination of values as described above, including output from one or more machine-learning models and action datum, a predetermined class, such as without limitation of validity A second fuzzy set 316, which may represent any value which may be represented by first fuzzy set 304, may be defined by a second membership function 320 on a second range 324; second range 324 may be identical and/or overlap with first range 312 and/or may be combined with first range via Cartesian product or the like to generate a mapping permitting evaluation overlap of first fuzzy set 304 and second fuzzy set 316. Where first fuzzy set 304 and second fuzzy set 316 have a region 328 that overlaps, first membership function 308 and second membership function 320 may intersect at a point 332 representing a probability, as defined on probability interval, of a match between first fuzzy set 304 and second fuzzy set 316. Alternatively or additionally, a single value of first and/or second fuzzy set may be located at a locus 336 on first range 312 and/or second range 324, where a probability of membership may be taken by evaluation of first membership function 308 and/or second membership function 320 at that range point. A probability at 328 and/or 332 may be compared to a threshold 340 to determine whether a positive match is indicated. Threshold 340 may, in a non-limiting example, represent a degree of match between first fuzzy set 304 and second fuzzy set 316, and/or single values therein with each other or with either set, which is sufficient for purposes of the matching process; for instance, threshold may indicate a sufficient degree of overlap between an output from one or more machine-learning models and/or action datum and a predetermined class, such as without limitation validity categorization, for combination to occur as described above. Alternatively, or additionally, each threshold may be tuned by a machine-learning and/or statistical process, for instance and without limitation as described in further detail below.

Further referring to FIG. 3, in an embodiment, a degree of match between fuzzy sets may be used to classify an action datum with validity. For instance, if an action datum has a fuzzy set matching valid fuzzy set by having a degree of overlap exceeding a threshold, computing device 104 may classify the action datum as belonging to the valid categorization. Where multiple fuzzy matches are performed, degrees of match for each respective fuzzy set may be computed and aggregated through, for instance, addition, averaging, or the like, to determine an overall degree of match.

Still referring to FIG. 3, in an embodiment, an action datum may be compared to multiple validity categorization fuzzy sets. For instance, action datum may be represented by a fuzzy set that is compared to each of the multiple validity categorization fuzzy sets; and a degree of overlap exceeding a threshold between the action datum fuzzy set and any of the multiple validity categorization fuzzy sets may cause computing device 104 to classify the action datum as belonging to validity categorization. For instance, in one embodiment there may be two validity categorization fuzzy sets, representing respectively validity categorization and invalidity categorization. First validity categorization may have a first fuzzy set; Second invalidity categorization may have a second fuzzy set; and action datum may have an action datum fuzzy set. Processor 104, for example, may compare an action datum fuzzy set with each of validity categorization fuzzy set and invalidity categorization fuzzy set, as described above, and classify an action datum to either, both, or neither of validity categorization nor invalidity categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, action datum may be used indirectly to determine a fuzzy set, as action datum fuzzy set may be derived from outputs of one or more machine-learning models that take the action datum directly or indirectly as inputs.

Still referring to FIG. 3, a processor 104 may use a logic comparison program, such as, but not limited to, a fuzzy logic model to determine a valid response. An valid response may include, but is not limited to, amateur, average, knowledgeable, superior, and the like; each such valid response may be represented as a value for a linguistic variable representing valid response or in other words a fuzzy set as described above that corresponds to a degree of completion as calculated using any statistical, machine-learning, or other method that may occur to a person skilled in the art upon reviewing the entirety of this disclosure. In other words, a given element of action datum may have a first non-zero value for membership in a first linguistic variable value such as "invalid" and a second non-zero value for membership in a second linguistic variable value such as "valid" In some embodiments, determining a valid categorization may include using a linear regression model. A linear regression model may include a machine learning model. A linear regression model may be configured to map data of action datum, such as time for completion to one or more validity parameters. A linear regression model may be trained using a machine learning process. A linear regression model may map statistics such as, but not limited to, quality of action datum completion. In some embodiments, determining a validity of action datum may include using an validity classification model. A validity classification model may be configured to input collected data and cluster data to a centroid based on, but not limited to, frequency of appearance, linguistic indicators of quality, and the like. Centroids may include scores assigned to them such that quality of completion of action datum may each be assigned a score. In some embodiments, and validity classification model may include a K-means clustering model. In some embodiments, and validity classification model may include a particle swarm optimization model. In some embodiments, determining the validity of an action datum may include using a fuzzy inference engine. A fuzzy inference engine may be configured to map one or more action datum data elements using fuzzy logic. In some embodiments, action datum may be arranged by a logic comparison program into validity arrangements. An "validity arrangement" as used in this disclosure is any grouping of objects and/or data based on skill level and/or output score. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a centroid corresponding to a given [ . . . ] level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 3, an inference engine may be implemented according to input and/or output membership functions and/or linguistic variables. For instance, a first linguistic variable may represent a first measurable value pertaining to an action datum's validity, such as a degree of an element of action datum, while a second membership function may indicate a decree of invalidity of a subject thereof, or another measurable value pertaining to action datum. Continuing the example, an output linguistic variable may represent, without limitation, a score value. An inference engine may combine rules, such as: "if the difficulty level is 'hard' and the popularity level is 'high', the question score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Further referring to FIG. 3, action datum to be used may be selected by user selection, and/or by selection of a distribution of output scores, such as 30% hard/expert, 40% moderate average, and 30% easy/beginner levels or the like. Each validity categorization may be selected using an additional function such as invalidity as described above.

Figure 4:
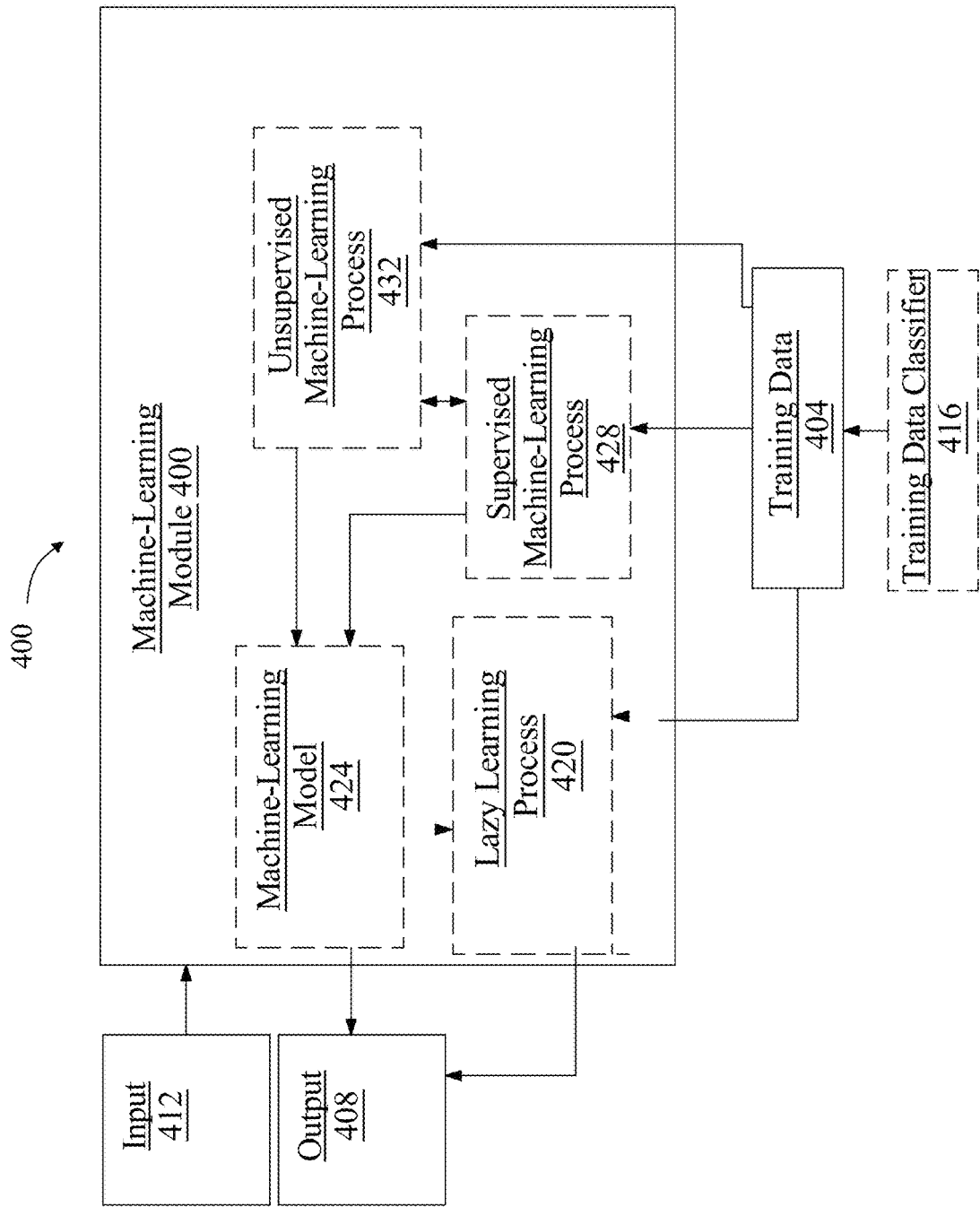
FIG. 4 is a block diagram of exemplary machine-learning processes.

Referring now to FIG. 4, an exemplary embodiment of a machine-learning module 400 that may perform one or more machine-learning processes as described in this disclosure is illustrated. Machine-learning module 400 may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce outputs given data provided as inputs; this contrasts with a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Processor 104 may use automatic speech recognition may use various combinations of a number of training techniques to improve results. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimates of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach). Neural networks may allow discriminative training in a natural and efficient manner to classify photographic evidence of action datums 112. A neural network may be employed by automatic photographic recognition processes for pre-processing, feature transformation and/or dimensionality reductions. In some embodiments, the long short-term memory (LSTM) and related recurrent neural networks may be trained to log what photographic or video evidence of properly completed action datums look like so there could be an additional level of validation beyond that of the action datum validator 124.

Multiple categories of data elements may be related in training data according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input 412 data as described in this disclosure to any output 308 data as described in this disclosure.

Further referring to FIG. 4, training data 404 may be filtered, sorted, and/or selected using one or more supervised and/or unsupervised machine-learning processes 432 and/or models as described in further detail below; such models may include without limitation a training data classifier 416. Training data classifier 416 may include a "classifier," which as used in this disclosure is a machine-learning model 424 as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output 408 at least a datum that labels or otherwise identifies a set of data that are clustered together, found to be close under a distance metric as described below, or the like. Machine-learning module 400 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 4, machine-learning module 400 may be configured to perform a lazy-learning process and/or protocol, which may alternatively be referred to as a "lazy loading" or "call-when-needed" process and/or protocol, may be a process whereby machine learning is conducted upon receipt of an input 412 to be converted to an output 408, by combining the input 412 and training set to derive the algorithm to be used to produce the output 408 on demand. For instance, an initial set of simulations may be performed to cover an initial heuristic and/or "first guess" at an output and/or relationship. As a non-limiting example, an initial heuristic may include a ranking of associations between inputs and elements of training data. Heuristic may include selecting some number of highest-ranking associations and/or training data elements. Lazy learning 420 may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models. A "machine-learning model," as used in this disclosure, is a mathematical and/or algorithmic representation of a relationship between inputs and outputs, as generated using any machine-learning process including without limitation any process as described above and stored in memory; an input 412 is submitted to a machine-learning model 424 once created, which generates an output 408 based on the relationship that was derived. For instance, and without limitation, a linear regression model, generated using a linear regression algorithm, may compute a linear combination of input 412 data using coefficients derived during machine-learning processes to calculate an output datum. As a further non-limiting example, a machine-learning model may be generated by creating an artificial neural network, such as a convolutional neural network comprising an input 412 layer of nodes, one or more intermediate layers, and an output 408 layer of nodes. Connections between nodes may be created via the process of "training" the network, in which elements from a training data 404 set are applied to the input 412 nodes, a suitable training algorithm (such as Levenberg-Marquardt, conjugate gradient, simulated annealing, or other algorithms) is then used to adjust the connections and weights between nodes in adjacent layers of the neural network to produce the desired values at the output 408 nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include subject-specific data as described above as inputs, description-specific data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process 432, as used herein, is a process that derives inferences in datasets without regard to labels; as a result, an unsupervised machine-learning process 432 may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
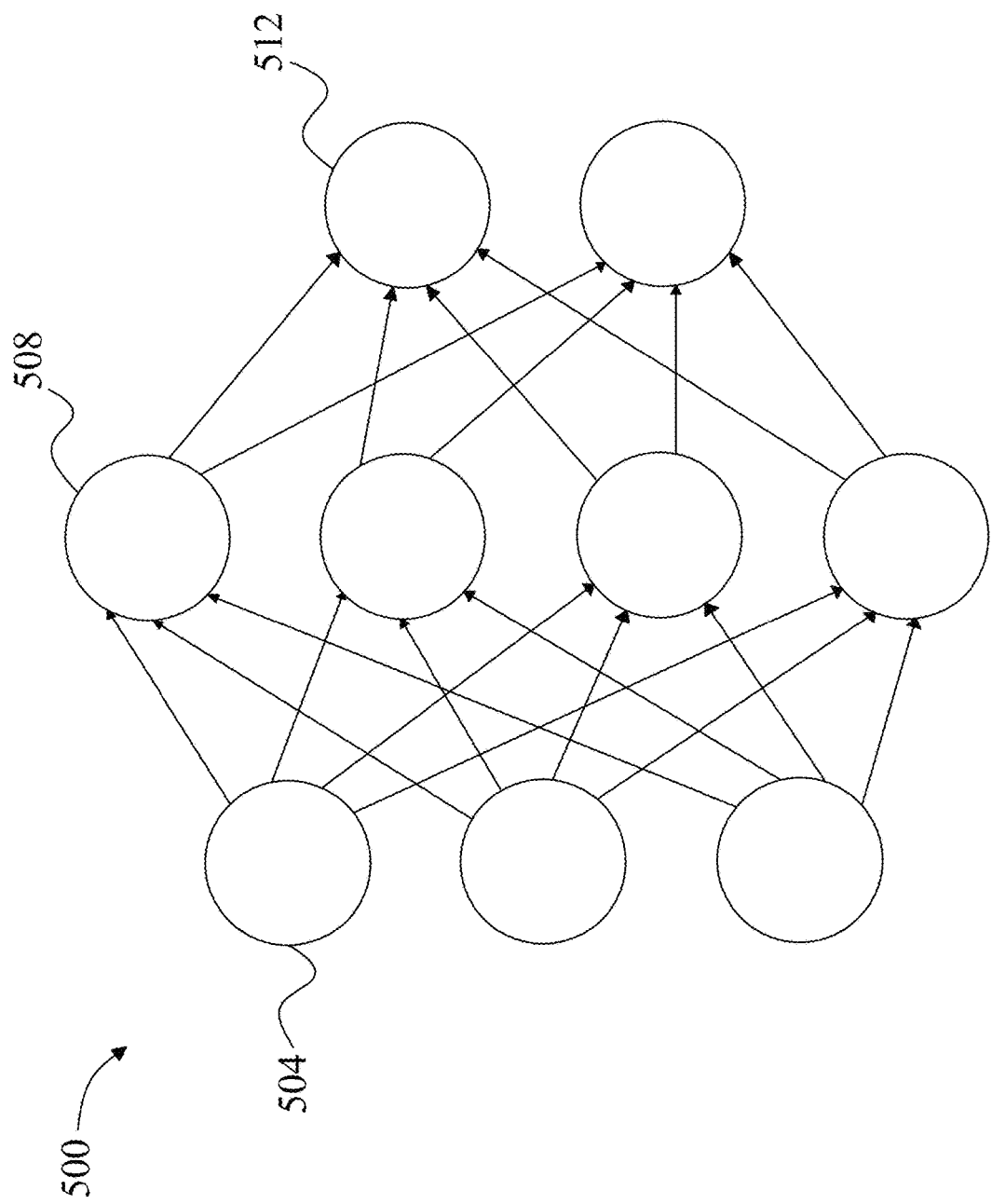
FIG. 5 illustrates an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 6:
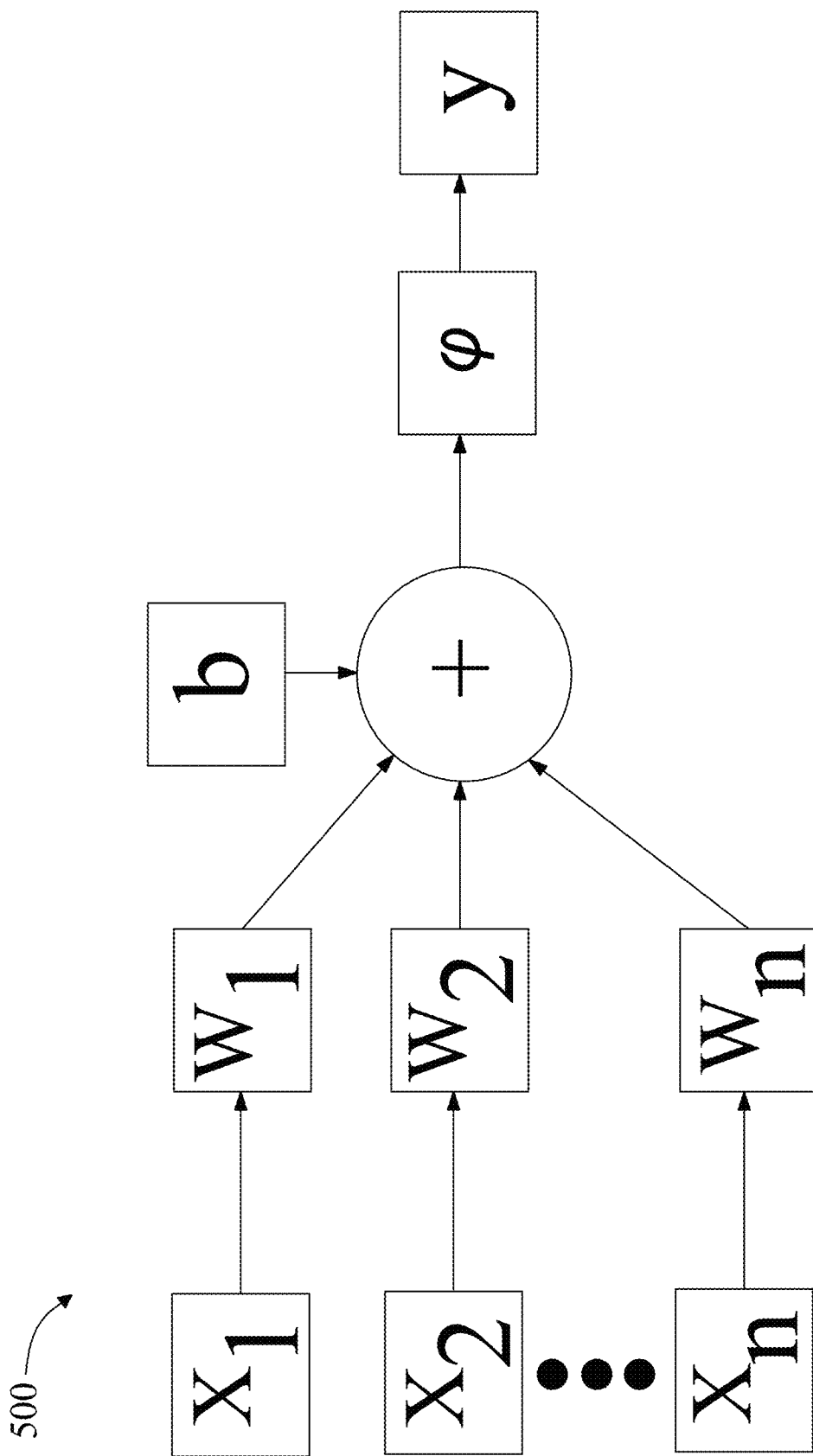
FIG. 6 illustrates a block diagram of an exemplary embodiment of a node of a neural network and FIG. 7 is a flow diagram illustrating the method for generating action-datum validation

Referring now to FIG. 6, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 7:
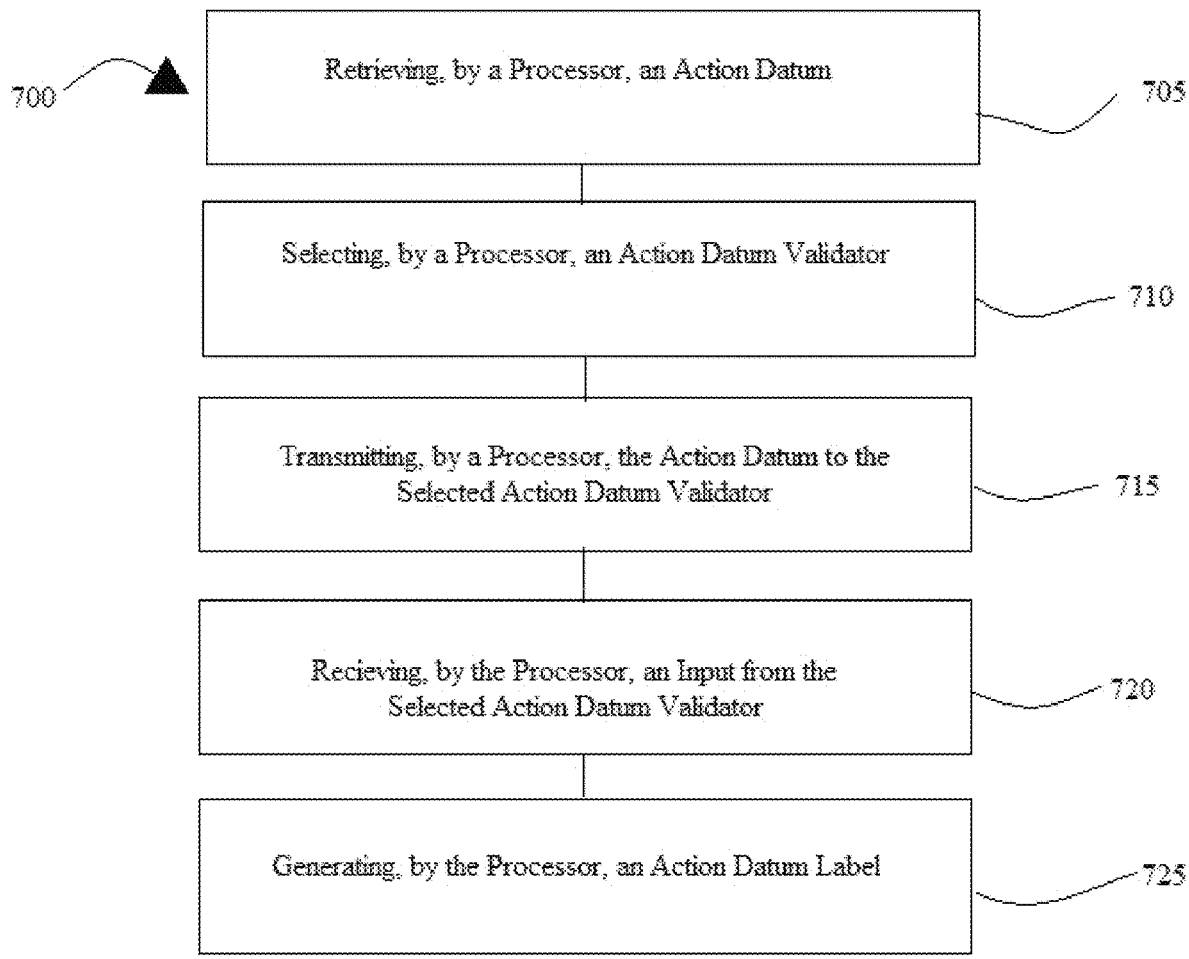

Referring now to FIG. 7, an exemplary method for action datum validation is illustrated by way of a flow diagram. At step 705, method 6700 includes receiving, by a processor, an action datum. An action datum may be a task. In some embodiments, processor is configured to receive an action datum from the action datum identifier. This may be implemented, without limitation, as disclosed with reference to FIGS. 1-6.

At step 710, method 700 includes selecting, by a processor an action datum validator. An action datum validator may be a user other than the action datum identifier. In some embodiments, a machine-learning method may be used to select an action datum validator. This may be implemented, without limitation, as disclosed in FIGS. 1-6.

At step 715, method 700 includes transmitting, by a processor, the action datum to the selected action datum validator. In some embodiments, a transmission protocol may be used to transmit the action datum to the selected action datum validator. This may be implemented, without limitation, as disclosed in FIGS. 1-6.

At step 720, method 700 includes receiving, by a processor an input from the selected action datum validator. The input may be a score, ranking, grade, and the like, of the quality of completion of the action datum. This may be implemented, without limitation, as disclosed in FIGS. 1-6.

At step 725, method 700 includes generating, by a processor, an action datum label. The action datum label may be a complete action datum or an incomplete action datum. In some embodiments, an aggregate label may be used to combine several action datum labels into one final label. This may be implemented, without limitation, as disclosed in FIG. 1-6.

An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Figure 8:
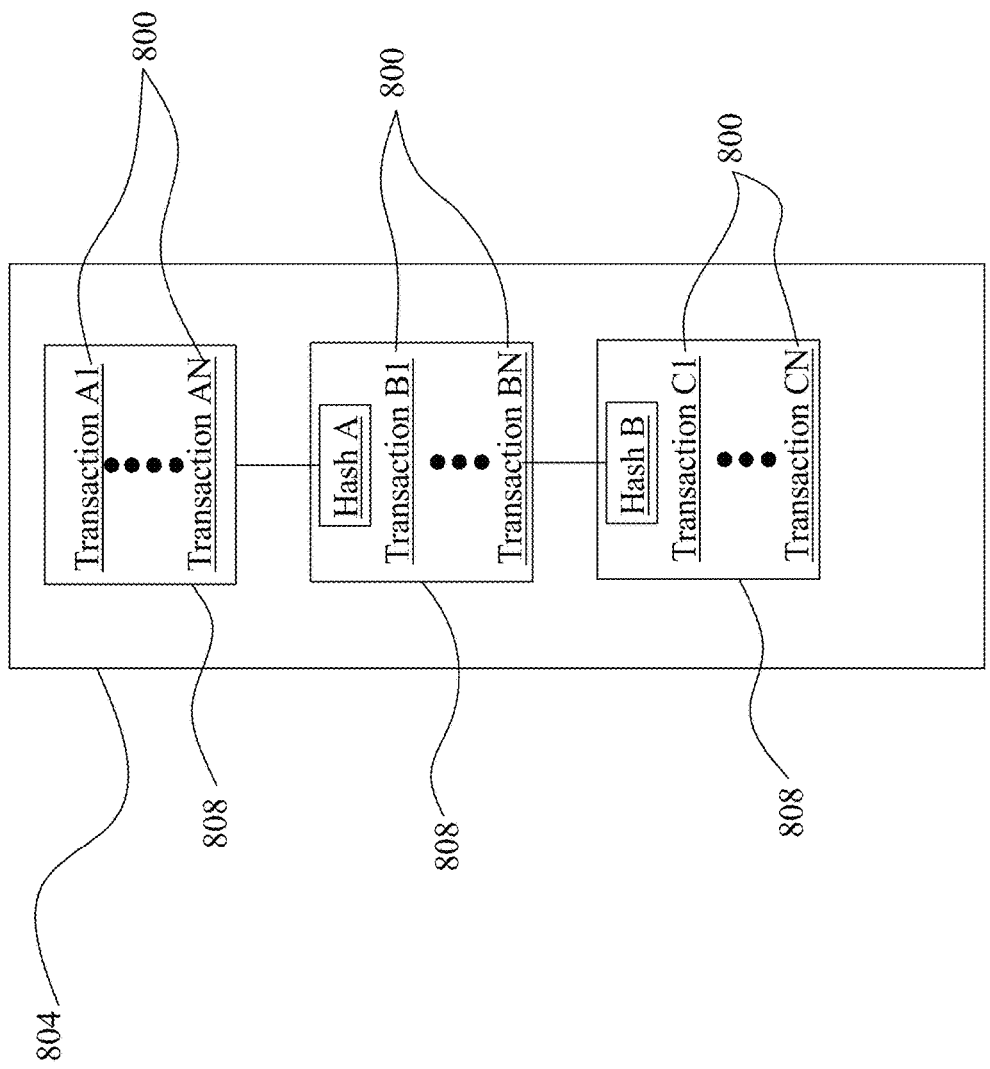
FIG. 8 is a flow diagram illustrating an embodiment of a block-chain

Referring now to FIG. 8, an exemplary embodiment of an immutable sequential listing 1XX is illustrated. Data elements are listing in immutable sequential listing 1XX; data elements may include any form of data, including textual data, image data, encrypted data, cryptographically hashed data, and the like. Data elements may include, without limitation, one or more at least a digitally signed assertion. In one embodiment, a digitally signed assertion 804 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 804. In an embodiment, collection of textual data states that the owner of a certain transferable item represented in a digitally signed assertion 804 register is transferring that item to the owner of an address. A digitally signed assertion 804 may be signed by a digital signature created using the private key associated with the owner's public key, as described above.

Still referring to FIG. 8, a digitally signed assertion 804 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 804 may describe the transfer of a physical good; for instance, a digitally signed assertion 804 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 804 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 8, in one embodiment, an address is a textual datum identifying the recipient of virtual currency or another item of value in a digitally signed assertion 804. In some embodiments, address is linked to a public key, the corresponding private key of which is owned by the recipient of a digitally signed assertion 804. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 804 may record a subsequent a digitally signed assertion 804 transferring some or all the value transferred in the first a digitally signed assertion 804 to a new address in the same manner. A digitally signed assertion 804 may contain textual information that is not a transfer of some item of value in addition to, or as an alternative to, such a transfer. For instance, as described in further detail below, a digitally signed assertion 804 may indicate a confidence level associated with a distributed storage node as described in further detail below.

In an embodiment, and still referring to FIG. 8 immutable sequential listing 1XX records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 1XX may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 8, immutable sequential listing 1XX may preserve the order in which the at least a posted content took place by listing them in chronological order; alternatively or additionally, immutable sequential listing 1XX may organize digitally signed assertions 804 into sub-listings 808 such as "blocks" in a blockchain, which may be themselves collected in a temporally sequential order; digitally signed assertions 804 within a sub-listing 808 may or may not be temporally sequential. The ledger may preserve the order in which at least a posted content took place by listing them in sub-listings 808 and placing the sub-listings 808 in chronological order. The immutable sequential listing 1XX may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 1XX may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 8, immutable sequential listing 1XX, once formed, may be inalterable by any party, no matter what access rights that party possesses. For instance, immutable sequential listing 1XX may include a hash chain, in which data is added during a successive hashing process to ensure non-repudiation. Immutable sequential listing 1XX may include a block chain. In one embodiment, a block chain is immutable sequential listing 1XX that records one or more new at least a posted content in a data item known as a sub-listing 808 or "block." An example of a block chain is the BITCOIN block chain used to record BITCOIN transactions and values. Sub-listings 808 may be created in a way that places the sub-listings 808 in chronological order and link each sub-listing 808 to a previous sub-listing 808 in the chronological order so that any computing device may traverse the sub-listings 808 in reverse chronological order to verify any at least a posted content listed in the block chain. Each new sub-listing 808 may be required to contain a cryptographic hash describing the previous sub-listing 808. In some embodiments, the block chain contains a single first sub-listing 808 sometimes known as a "genesis block."

Still referring to FIG. 8, the creation of a new sub-listing 808 may be computationally expensive; for instance, the creation of a new sub-listing 808 may be designed by a "proof of work" protocol accepted by all participants in forming the immutable sequential listing 1XX to take a powerful set of computing devices a certain period to produce. Where one sub-listing 808 takes less time for a given set of computing devices to produce the sub-listing 808 protocol may adjust the algorithm to produce the next sub-listing 808 so that it will require more steps; where one sub-listing 808 takes more time for a given set of computing devices to produce the sub-listing 808 protocol may adjust the algorithm to produce the next sub-listing 808 so that it will require fewer steps. As an example, protocol may require a new sub-listing 808 to contain a cryptographic hash describing its contents; the cryptographic hash may be required to satisfy a mathematical condition, achieved by having the sub-listing 808 contain a number, called a nonce, whose value is determined after the fact by the discovery of the hash that satisfies the mathematical condition. Continuing the example, the protocol may be able to adjust the mathematical condition so that the discovery of the hash describing a sub-listing 808 and satisfying the mathematical condition requires steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 808 according to the protocol is known as "mining." The creation of a new sub-listing 808 may be designed by a "proof of stake" protocol as will be apparent to those skilled in the art upon reviewing the entirety of this disclosure.

Continuing to refer to FIG. 8, in some embodiments, protocol also creates an incentive to mine new sub-listings 808. The incentive may be financial; for instance, successfully mining a new sub-listing 808 may result in the person or entity that mines the sub-listing 808 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 808 Each sub-listing 808 created in immutable sequential listing 1XX may contain a record or at least a posted content describing one or more addresses that receive an incentive, such as virtual currency, as the result of successfully mining the sub-listing 808.

With continued reference to FIG. 8, where two entities simultaneously create new sub-listings 808, immutable sequential listing 1XX may develop a fork; protocol may determine which of the two alternate branches in the fork is the valid new portion of the immutable sequential listing 1XX by evaluating, after a certain amount of time has passed, which branch is longer. "Length" may be measured according to the number of sub-listings 808 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 808 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 1XX branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 1XX.

Still referring to FIG. 8, additional data linked to at least a posted content may be incorporated in sub-listings 808 in the immutable sequential listing 1XX; for instance, data may be incorporated in one or more fields recognized by block chain protocols that permit a person or computer forming a at least a posted content to insert additional data in the immutable sequential listing 1XX. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 8, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 808 in a block chain computationally challenging; the incentive for producing sub-listings 808 may include the grant of new crypto-currency to the miners. Quantities of crypto-currency may be exchanged using at least a posted content as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Figure 9:
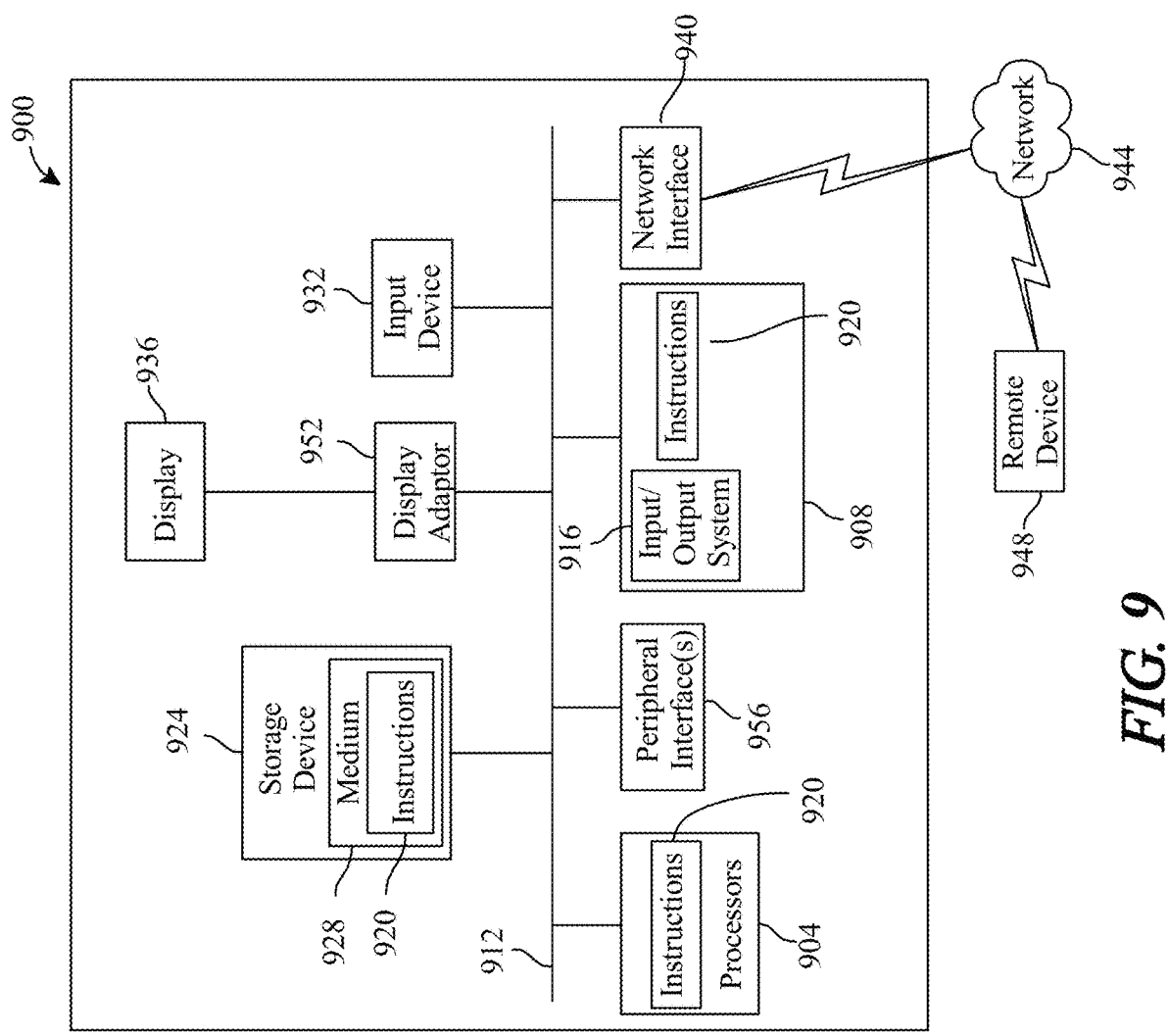
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 909 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 909 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 909. Memory 909 may also include (e.g., stored on one or more machine-readable media) instructions (e.g., software) 920 embodying any one or more of the aspects and/or methodologies of the present disclosure. In another example, memory 909 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 949 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an action validation protocol, the apparatus comprising:
   at least a processor; and
   a memory connected to the at least a processor, the memory containing instructions configuring the at least a processor to:
   retrieve an action datum;
   select an action datum validator, wherein selecting the action datum further comprises:
   training a machine-learning process using training data comprising a plurality of inputs containing action datum validator information correlated to a plurality of outputs containing action datum validators;
   iteratively retraining the machine-learning process until an error function comparing action datum validator outputs of the machine-learning process to input-output pairs of action datum validator information and action datum validators in the training data is minimized;
   receiving a plurality of action datum validator information associated with a plurality of potential action datum validators;

selecting the action datum validator from the plurality of potential action datum validators as a function of the trained machine-learning process;
locating a plurality of validators contained within a specified location; and
using the selected action datum validator from the plurality of validators as a function of a cryptanalysis protocol;
transmit the action datum to the selected action datum validator, wherein the selected action datum validator is configured to validate completion of the action datum as a function of identifying a percentage of completion of the action datum;
receive an input from the selected action datum validator;
generate an action validation label as a function of the input from the selected action datum validator; and
generate a token certificate as a function of the action validation label and the selected action datum validator.

2. The apparatus of claim 1, where the at least a processor is further configured to:
receive an input;
generate an action datum label as a function of the input.

3. The apparatus of claim 1, wherein retrieving the action datum further comprises identifying a completed action and an action identifier.

4. The apparatus of claim 1, wherein retrieving the action datum further comprises completing an action datum entry protocol.

5. The apparatus of claim 1, wherein selecting the action datum validator further comprises selecting the action datum validator as a function of a geographic location of the action identifier.

6. The apparatus of claim 1, wherein receiving the input from the selected action datum validator further comprising initiating an action validation protocol.

7. The apparatus of claim 1, wherein the machine-learning action datum validator coefficients are tuned according to a clustering algorithm.

8. The apparatus of claim 1, wherein transmitting the action datum to the selected action datum validator comprises:
receiving a completed action datum from the action datum identifier
transferring the completed action to the selected action datum validator as a function of a transmission protocol.

9. The apparatus of claim 1, wherein receiving the input from the selected action datum validator further comprises receiving a validity string.

10. The apparatus of claim 2, wherein generating the action datum label further comprises the action datum identifier repeating the action datum entry protocol until the action datum label is validated.

11. A method for generating an action validation protocol, the method comprising:
retrieving, by a processor, an action datum wherein the action datum identifies a action and an action identifier;
selecting, by the processor, an action datum validator, wherein selecting the action datum validator comprises:
training, by the processor, a machine-learning process using training data comprising a plurality of inputs containing action datum validator information correlated to a plurality of outputs containing action datum validators;
iteratively retraining, by the processor, the machine-learning process until an error function comparing action datum validator outputs of the machine-learning process to input-output pairs of action datum validator information and action datum validators in the training data is minimized;
receiving, by the processor, a plurality of action datum validator information associated with a plurality of potential action datum validators;
selecting, by the processor, the action datum validator from the plurality of potential action datum validators as a function of the trained machine-learning process;
locating, by the processor, a plurality of validators contained within a specified location; and
using, by the processor, the selected action datum validator from the plurality of validators as a function of a cryptanalysis protocol;
transmitting, by the processor, the action datum to the selected action datum validator, wherein the selected action datum validator is configured to validate completion of the action datum as a function of identifying a percentage of completion of the action datum;
receiving, by the processor, an input from the selected action datum validator;
generating, by the processor, an action validation label as a function of the input from the selected action datum validator;
generating, by the processor, a token certificate as a function of the action validation label and the selected action datum validator.

12. The method of claim 11, wherein retrieving the action datum further comprises the action datum identifying a completed action and action identifier.

13. The method of claim 11, wherein retrieving the action datum further comprises the action identifier completing an action datum entry protocol.

14. The method of claim 11, wherein selecting the action datum validator further comprises selecting based on a geographic location of the action identifier.

15. The method of claim 11, wherein receiving input from the selected action datum validator further comprising initiation of an action validation protocol.

16. The method of claim 11, comprising action datum validator selection wherein:
retrieving, by a processor, an action datum wherein the action datum identifies an action and an action identifier;
selecting, by the processor, an action datum validator;
transmitting, by the processor, an action datum validator;
receiving, by the processor, an input from the selected action datum validator; and
generating, by the processor, an action datum label as a function of the input from the selected action datum validator.

17. The method of claim 11, wherein transmitting the action datum to the selected action datum validator comprising:
receiving a completed action datum from the action datum identifier;
transferring the completed action to action datum validator using a transmission protocol.

18. The method of claim 11, wherein receiving the input from the selected action datum validator further comprises a validity string.

19. The method of claim 16, wherein generating the action datum label as a function of the input from the selected action datum validator further comprises the action datum identifier repeating the action datum entry protocol until the action datum label is validated.

20. The method of claim 19, wherein action datum labels are combined into an aggregate label.

* * * * *